Patented June 1, 1937

2,082,156

UNITED STATES PATENT OFFICE 2,082,156

AZO DYESTUFFS

Friedrich Felix and Wilhelm Huber, Basel, Switzerland, assignors to the firm of Society of Chemical Industry in Basle, Basel, Switzerland No Drawing. Original application March 21, 1935, Serial No. 12,299. Divided and this application October 15, 1935, Serial No. 45,164. In Switzerland March 24, 1934

14 Claims. (Cl. 260—96)

This application is a division of our application for patent Ser. No. 12,299, filed in the U. S. A. on March 21, 1935, and in Switzerland on March 24, 1934.

This invention relates to the manufacture of dyestuffs by coupling a diazotized aromatic amine of the general formula

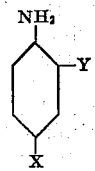

in which Y stands for a sulfone radical of the general formula SO₂—CH₂—R wherein R represents H, alkyl or phenyl, and X stands for a nitrogenous group which is linked with its nitrogen atom to the organic radical, such as an NO₂-group, an

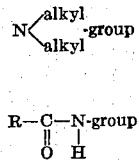

an

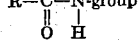

(R representing hydrogen, alkyl, aralkyl or aryl), e. g. an acidylamino-group, such as an acetylamino- or benzoylamino-group, with a coupling component of the general formula

in which A stands for a nucleus of the benzene series which may or may not be substituted, and R₁ and R₂ stand for hydrogen, alkyl, aryl or aralkyl radicals, the conditions of coupling being chosen in such a manner that the

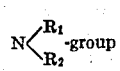

is the group which causes coupling.

The term "alkyl radicals" comprises not only the radicals of hydrocarbons, such as methyl, ethyl, propyl or butyl radicals, and the like, but also, as used in the scientific literature, cf. "Anthracene and Anthraquinone" by E. de Barry Barnett, London 1921, page 207, and in the patent literature cf. British Patent 26,336/1910 claim 1, substituted alkyl radicals, for example alkyl radicals substituted by halogen, such as, for example, chloro-, bromo- or iodo-ethyl radicals, alkyl radicals substituted by OH-groups, such as hydroxyethyl-, hydroxypropyl-, hydroxybutyl- or dihydroxy-propylene radicals, further the ethers and esters thereof, such as methoxyethyl- or acetoxyethyl- or ethylsulfuric acid radicals, further also alkylcarboxylic acid radicals and their derivatives, such as propionic acid radicals or propionic ester radicals or propionic acid amide radicals, or the radicals of ethylnitrile or ethylsulfocyanide. The aryl- or aralkyl-radicals R₁ and R₂ may also be substituted in the aromatic nucleus.

As products of the general formula

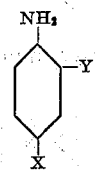

there may be named, for instance, 1-amino-4-nitrobenzene-2-methyl- (or 2-ethyl- or 2-benzyl- or 2-hydroxyethyl- or 2-hydroxybenzyl- or 2-carboxymethyl- or carboxymethylester - methyl) - sulfone, the corresponding 1-amino-4-nitro-5-chlorobenzene-2-alkylsulfone, the corresponding 1-amino-4-nitro - 6 - chlorobenzene - 2 - alkylsulfone, the corresponding sulfones in which the chlorine is exchanged for bromine or iodine, and 1-amino-4,6-dinitrobenzene - 2 - methylsulfone, further the 1-amino-4-acetylaminophenyl-2 - methylsulfone, the 1-amino - 4 - acetylaminophenyl-2-ethylsulfone, the 1-amino-5-chloro-4-acetylaminophenyl-2-methylsulfone, the 1-amino-4-benzoylaminophenyl-2-methylsulfone, the 1-amino-4-(4'-methoxy)-benzoylaminophenyl-2-methylsulfone, the 1-amino-4-(4'-chloro)-benzoylaminophenyl-2-methylsulfone, the 1-amino-4-benzoylaminophenyl-2-ethylsulfone, the 1-amino-4-benzolaminophenyl-2-benzylsulfone, the 1-amino - 4-phenoxyacetylaminophenyl-2-methylsulfone, the 1-amino-4(4'-ethoxy)-phenoxyacetylaminophenyl - 2 - methylsulfone, the 1 - amino - 4(2' - methyl) - phenoxyacetylamiophenyl-2-ethylsulfone, the 1-amino-4-phenyl-acetylaminophenyl-2-methylsulfone, the 1-amino-4-dimethylaminophenyl-2-ethylsulfone, the 1-amino-4-diethylaminophenyl - 2 - ethylsulfone, and the like.

As coupling components of the general formula

also explained above, there are suitable any bases of the benzene series capable of coupling, such as aniline as well as the homologues, analogues and N-substitution products of this base, for example meta-toluidine, meta-phenylenediamine, meta-toluylenediamine, meta-aminophenol, para-xylidine, 1-amino-2-methoxy-5-methylbenzene of the formula

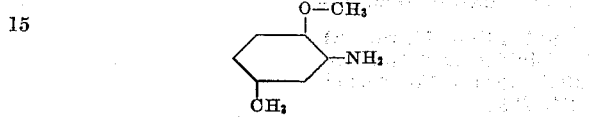

and its N-dimethyl derivatives, and particularly, for example, N-methoxyethylaminobenzene of the formula

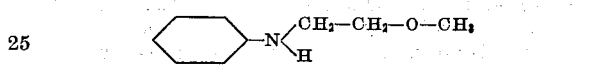

N-ethyl-N-methoxyethylaminobenzene of the formula

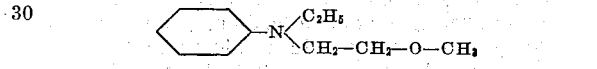

ω-bromoethyl-ethylaminobenzene of the formula

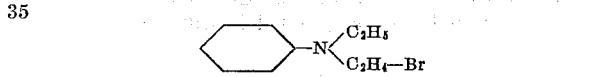

ω-ethyl-cyanide-ethylaminobenzene of the formula

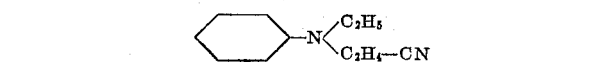

ω-thiocyanogen-ethyl-ethylaminobenzene of the formula

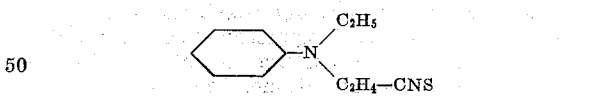

ω-sulfatoethyl-ethylaminobenzene of the formula

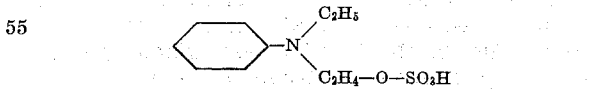

1 - (N - ethyl-N-methoxyethyl)-amino-3-methylbenzene, 2 - methoxy - 5 - methyl-1-N-(methoxyethyl) - aminobenzene, 2 - methoxy-5-methyl-1-(N - ethyl - N - methoxyethyl)-aminobenzene, 2-methoxy-5-methyl-1-N-(butyl-N-methoxyethyl)-aminobenzene, 2 - methoxy - 5 -methyl-1-N-(di-methoxyethyl)-aminobenzene of the formula

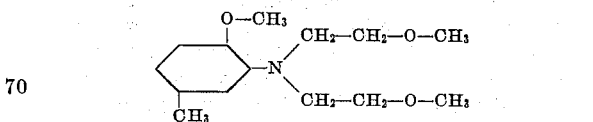

2-methoxy - 5- methyl-N-(di-ω-aminoethyl)-aminobenzene, 2,5 - dimethoxy - 1 - N - (methoxyethyl)-aminobenzene, 2,5-dimethoxy-1-N-(di-methoxyethyl)-aminobenzene, N - ethyl - N - hydroxyethylaminobenzene, N - butyl - N - hydroxyethylaminobenzene, 3 - methyl-1-(N-ethyl-N-hydroxyethyl) - aminobenzene, 3 - methyl - 1 - (N - butyl-N-hydroxyethyl)-aminobenzene, 2 - methoxy-5-methyl-1-N-hydroxyethylaminobenzene, 2-methoxy - 5 - methyl - 1-(N-methoxyethyl-N-hydroxyethyl)-aminobenzene, 2-methoxy-5-methyl-(N - ethyl - N - hydroxy-ethyl)-aminobenzene, 2-methoxy-5-methyl-1-(N-butyl-N-hydroxyethyl)-aminobenzene, 2-methoxy-5-methyl-1-N-(di-β-hydroxyethyl)-aminobenzene, 2,5-dimethoxy-1-N-hydroxyethyl-aminobenzene, 2,5-dimethoxy-1-(N-ethyl-N-hydroxyethyl)-aminobenzene, 2,5-dimethoxy-1-(N-methoxyethyl-N-hydroxyethyl)-aminobenzene, 2,5-dimethoxy - 1 - N - (di-β-hydroxyethyl) - aminobenzene, N-ethyl-N-acetoxyethylaminobenzene of the formula

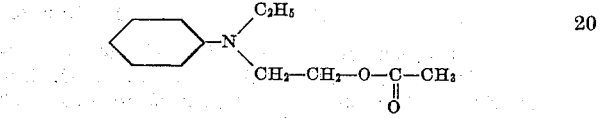

2-methoxy-5-methyl-1-N-(diacetoxyethyl) - aminobenzene, 2-methoxy-5-methyl-1-(N-ethyl-N-acetoxyethyl)-aminobenzene, 2,5-dimethoxy-1-(N-ethyl-N-acetoxyethyl)-aminobenzene, 2,5-dimethoxy-1-(N-diacetoxyethyl)-aminobenzene, 2-methoxy - 5 - methyl-1-N-(methoxyethyl-β-γ-dihydroxypropyl) - aminobenzene, 2 - methoxy - 5-methyl - 1 - N -(hydroxyethyl-β-γ-dihydroxypropyl) - aminobenzene, 2- methoxy-5-methyl-1-N-(hydroxyethyl-γ-ethoxy-β-hydroxypropyl) - aminobenzene, 2-methoxy-5-methyl-1-N-(hydroxyethyl-γ-methoxy-β-hydroxypropyl)-aminobenzene, 2-methoxy-5-methyl-1-N-(butyl-γ-ethoxy-β-hydroxypropyl)-aminobenzene, 2-methoxy-5-methyl-1-N-(butyl-γ-methoxy-β-hydroxypropyl)-aminobenzene, 2,5-dimethoxy-1-N-(methoxyethyl-β-γ-dihydroxypropyl) - aminobenzene, 2,5 - dimethoxy - 1 - N - (hydroxyethyl-β-γ-dihydroxypropyl)-aminobenzene, 2,5-dimethoxy-1-N-(hydroxyethyl-γ-ethoxy-β-hydroxypropyl)-aminobenzene, 2,5-dimethoxy-1-N-(hydroxyethyl-γ-methoxy-β-hydroxypropyl) - aminobenzene, 2,5 - dimethoxy - 1 - N - (butyl - γ - ethoxy-β-hydroxypropyl)-aminobenzene, 2,5-dimethoxy-1-N-(butyl-γ-methoxyethyl-β-hydroxypropyl)-aminobenzene, N-(γ-methoxy-β-hydroxypropyl)-n-butylaminobenzene, 3-methyl-1-N-(γ-methoxy-β-hydroxypropyl)-n-butylaminobenzene, N-(γ-ethoxy-β-hydroxypropyl)-n-butylaminobenzene, 3-methyl-1-N-(γ-ethoxy-β-hydroxypropyl)-n-butylaminobenzene, N-(di-β-hydroxyethyl)-aminobenzene, 3-methyl-1-N-(di-β-hydroxyethyl)-aminobenzene, 3-chloro-5-methoxy-1-N-(di-β-hydroxyethyl)-aminobenzene, 3-chloro-1-N-(di-β-hydroxyethyl)-aminobenzene, N-(di-β-γ-dihydroxypropyl)-aminobenzene and the like, also sulfonic acids of these compounds, this term including true sulfonic acids and also ester sulfonic acids.

Among the true sulfonic acids of the above cited compounds there may be named inter alia N-methyl- or N-ethyl-N-(4'-sulfo)-benzylaminobenzene, N-ethyl-N-benzylaminobenzene-3-sulfonic acid, diphenylamine-4-sulfonic acid and the like.

If the coupling component of the general formula

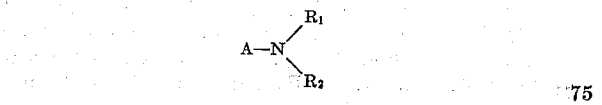

in which $R_1$ and $R_2$ stand for hydrogen, alkyl, aryl or aralkyl radicals, contains no phenolic OH-group in the aromatic nucleus A of the benzene series, the expression "coupling conditions in which the amino group

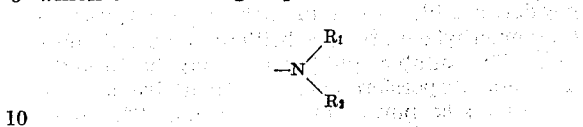

causes coupling" means the coupling of the component in neutral or acid medium usual for aromatic amines. However, if the aromatic nucleus A contains one or more phenolic OH-groups, only coupling in acid medium comes into consideration. But, as is well known, the selection of the coupling conditions in such a manner that the amino group of a coupling component is the group which causes coupling does not present a problem to the expert, but a known measure.

The dyestuffs thus produced can be converted into other valuable products by treating them with suitable reducing agents so that the nitro-group of the diazo-component is reduced, and, if desired, either acylating or alkylating the new amino-group by means of the usual agents, or converting the reduced body into other dyestuffs by diazotizing the amino-group and coupling with suitable coupling components.

The new dyestuffs correspond therefore to the general formula

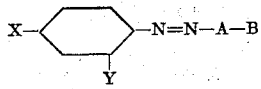

in which X stands for a nitrogenous group which is linked with its nitrogen atom to the aromatic nucleus, such as an $NO_2$-group, an $NH_2$-group, an

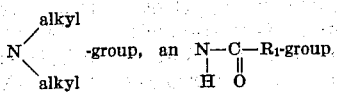

($R_1$ representing hydrogen, alkyl, aralkyl or aryl), i. e. an acetylamino or benzoylamino-group, a phenylacetylamino- or phenoxyacetylamino-group, Y stands for a sulfone radical of the general formula $SO_2$—$CH_2$—R (R representing H, alkyl or aryl), A for an aromatic nucleus of the benzene series, and B for an amino-group

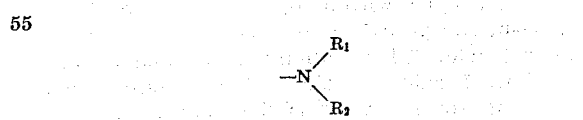

wherein $R_1$ and $R_2$ stand for H, alkyl, aryl or aralkyl, which amino-group stands in 4-position to the —N=N-group.

The dyestuffs thus obtained are red to green powders, which are excellently suitable for dyeing textiles of various kinds, for example wool, silk, artificial silk, cellulose, particularly esters and ethers thereof, for example acetylcellulose and other conversion products of cellulose, such as nitrocellulose etc. The dyestuffs are also suitable for dyeing lacquers, varnishes and plastic masses, particularly nitrocellulose and phenolformaldehyde lacquers. They dye these products the same tints as the textiles; unsulfonated dyestuffs are particularly suited for this purpose.

They can be used as intermediate products for the manufacture of further dyestuffs. Whereas the sulfonated dyestuffs are particularly valuable for dyeing and printing wool and for printing acetate artificial silk, the non-sulfonated dyestuffs, when brought into suitable form or suspended in a suitable medium, have pronounced affinity for cellulose esters and ethers, particularly acetate artificial silk. Besides dyestuffs which dye red, violet and brown tints there can, by a suitable choice of the coupling components be obtained dyestuffs which have the valuable property to dye acetate artificial silk blue tints capable of discharge.

Among the components which come into question for making wool dyestuffs there are suitable, quite generally, amino- or amino-hydroxy-compounds of the benzene series which are capable of coupling, or sulfonic acids of such compounds, particularly alkylaniline-sulfonic acids, for instance ethylbenzylaniline-sulfonic acid.

These dyestuffs correspond therefore to the general formula

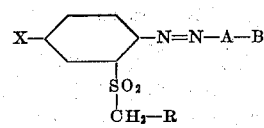

in which X, A, B and R have the significations indicated above, and in which the aromatic radical A carries at least one sulfo-group. They are dark powders dissolving in water with addition of alkalies to orange, to red, to violet and blue solutions and dyeing wool from an acid bath similar tints of good fastness properties.

For dyeing acetate artificial silk suitable dyestuffs are, in particular, obtained when such diazo-components of the kind in question are used as contain no sulfuric acid groups and the coupling components are simple aromatic bases, such as aniline and its homologues and analogues. There may be used therefore aniline, ortho- or meta-toluidine, para-xylidine, para-cresidine, 2,5-dihydroxyalkylaminobenzene, also the amines alkylated or hydroxyalkylated in the amino-group, and those hydroxyalkylated amines the hydroxy-groups of which can be etherified or esterified. The properties of fastness and the tints of the materials dyed with these dyestuffs are, within certain limits, altered by the selection of the substituents. These dyestuffs correspond to the general formula

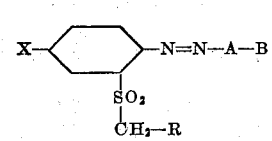

in which X, A, B and R have the signification indicated hereinbefore in the description of the starting materials, and in which the aromatic radical A carries no sulfo-groups. Among these dyestuffs those are particularly valuable which correspond to the general formula

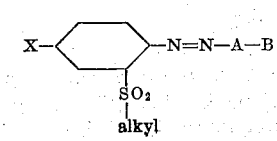

in which X, A and B have the signification already indicated.

All these products are dark powders insoluble in water, but dissolving in acetic ester to yellow to red to blue solutions and dyeing acetate artificial silk red to blue tints of good fastness. Among these products those are again particularly valuable in which X stands for a nitro-group.

Among these products special mention must be made of those products in which the radical A stands for a benzene radical and which correspond to the general formula

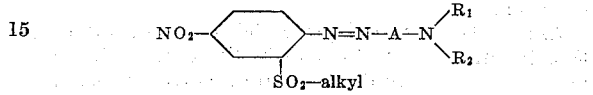

wherein the alkyl-group of the sulfone radical contains not more than two carbon atoms, A stands for an aromatic nucleus of the benzene series, the

stands in the 4-position to the azo-group, R₁ standing for alkyl or a hydrogen atom and R₂ for alkyl, at least one of the alkyl-groups being substituted by such a substituent as does not provoke solubility of the dyestuff in water. Such substituents are inter alia halogen, such as chlorine or bromine, cyanogen, thiocyanogen, OH, or quite generally the grouping —O—R₃, wherein R₃ stands for hydrogen, alkyl or acidyl.

All the above mentioned p-nitro-azo-dyestuffs in which A corresponds to a radical of the benzene series, are dark powders insoluble in water, but dissolving in acetic ester to violet to blue and green solutions, and dyeing acetate artificial silk from suspension dye-baths violet to blue and green tints.

These non-sulfonated dyestuffs, which are sparingly soluble in water, are used for dyeing acetate artificial silk, preferably in finely dispersed form produced by grinding them with dispersing agents, for instance the sulfonated residue from the manufacture of benzaldehyde or turpentine oil and the like, in the presence of water until a fine paste is produced; or they may be converted in the presence of further quantities of the aforesaid or other auxiliary substances, such as sulfite cellulose waste liquor, by cautiously drying them in a vacuum at a temperature which is not too high, into dry preparations capable of being powdered.

The following examples illustrate the invention, the parts being by weight:—

*Example 1*

23 parts of 2-amino-5-nitro-phenylethylsulfone are dissolved, while vigorously stirring, in about 300 parts of sulfuric acid and are then diazotized by the addition of 8 parts of sodium nitrite or the corresponding quantity of nitrosylsulfuric acid. Stirring is continued until a sample dissolves clearly in ice-water. The whole is now poured into much ice-water. The clear diazo-solution thus obtained is coupled with a solution of 16.5 parts of ethylhydroxyethylaniline in the necessary quantity of dilute mineral acid.

The dyestuff is precipitated in the form of a dark powder. When coupling has been completed by the addition of sodium acetate the dyestuff is filtered and washed until neutral.

The dyestuff thus obtained is, when dry, a dark powder, soluble in organic solvents such as acetone or ethylacetate to a brilliant blue-red solution. By suitable additions it may be brought into fine dispersion and will then dye acetate artificial silk pure violet red tints. The dyestuff corresponds with the formula

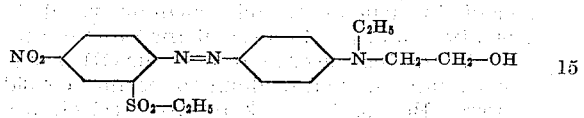

When substituting dimethyl- or diethylaniline for the N-ethyl, N-hydroxyethylaniline there are obtained bluish-red dyestuffs.

Scarlet red dyestuffs are obtained when using aniline as coupling component, the ω-methanesulfonic acid of the aniline is then united in known manner with the diazo compound, and the dyestuff saponified. Blue-red dyestuffs are further obtained from the same diazotizing component, and coupling components, such as

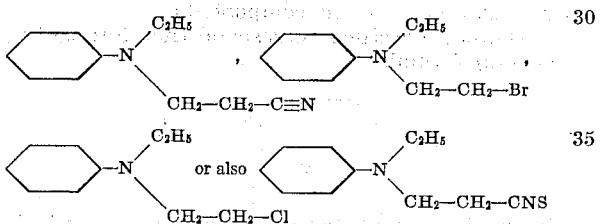

The products from N-hydroxyethylaminobenzene, N-methoxyethylaminobenzene, N-acetoxyethylaminobenzene, N-ethyl-N-acetoxyethylaminobenzene, N-methoxyethyl-, N-acetoxyethylaminobenzene, N - (diacetoxyethyl) - aminobenzenes are also blue-red dyestuffs. Further, the dyestuffs from meta-phenylenediamine, meta-toluylenediamine or mono-acetyl-metaphenylenediamine are red to scarlet red products.

*Example 2*

A diazo-solution made from 21.6 parts of 2-amino-5-nitrophenylmethylsulfone, as described above, is coupled with a solution of 17.9 parts of (ethyl-methoxyethyl)-aminobenzene in dilute mineral acid. The coupling is finished by the addition of sodium acetate. The dyestuff thus formed is a dark powder soluble in acetone, ethyl acetate or the like, to a red violet solution. In a suitable state of dispersion it dyes acetate artificial silk red-violet tints. The dyestuff corresponds with the formula

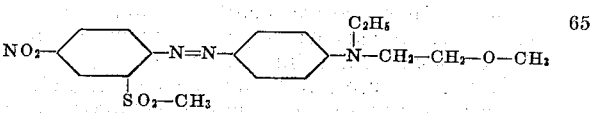

Also in this case the substitution of dimethylaniline or di-ethylaniline, or also aniline (here over the ω-methane-sulfonic acid) for ethylmethoxyethylaniline leads to red or scarlet red dyestuffs.

Example 3

A diazo-solution made from 21.6 parts of 2-amino-5-nitrophenylmethylsulfone is coupled with a solution of 25.3 parts of 2-methoxy-5-methyl-1-[(di-methoxyethyl)-amino]-benzene in dilute mineral acid. The coupling is finished by the addition of sodium acetate. The dyestuff thus obtained is a dark powder soluble in acetone, ethylacetate or the like to a red-violet solution. In suitable dispersion it dyes acetate artificial silk violet tints. The dyestuff corresponds with the formula

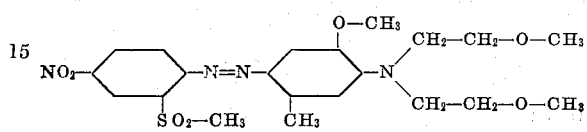

The dyestuff from 2-methoxy-5-methyl-aminobenzene dyes nitro-cellulose varnishes reddish-bordeaux tints. Bordeaux to blue-violet dyestuffs are further obtained when using as coupling component such N-substitution products of the 1-amino-2-methoxy-5-methylaminobenzene which correspond to the N-substitution products of the aniline cited in Example 1.

Like dyestuffs are obtained by the use of the corresponding ethylsulfones, for example 2-amino-5-nitro-phenyl-ethylsulfone, or 2-amino-5-nitro-phenylhydroxyethylsulfone. Blue dyestuffs are obtained by using sulfones which contain nitro-groups or halogen atoms as substituents.

Example 4

A diazo-solution made from 21.6 parts of 2-amino-5-nitro-phenylmethylsulfone is coupled with a solution of 19.5 parts of 2-methoxy-5-methyl-1-methoxyethyl-aminobenzene in dilute mineral acid. The coupling is completed by addition of sodium acetate. The dyestuff thus obtained is a dark powder soluble in acetone, ethyl acetate or the like to a red-violet solution. In suitable dispersion it dyes acetate artificial silk violet tints. The dyestuff corresponds with the formula.

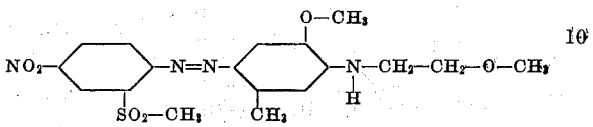

The dyestuff from 2,5-dimethyl-1-aminobenzene dyes nitrocellulose varnishes Bordeaux-red tints.

Example 5

A diazo-solution made from 21.6 parts of 2-amino-5-nitro-phenylmethylsulfone is coupled with a solution of 22.5 parts of 2-methoxy-5-methyl-1-(di-hydroxyethyl)-aminobenzene in dilute mineral acid. Coupling is completed by the addition of sodium acetate. The dyestuff thus obtained is a dark powder soluble in acetone, ethyl acetate or the like to a violet solution. In suitable dispersion it dyes acetate artificial silk blue-violet tints. The dyestuff corresponds with the formula

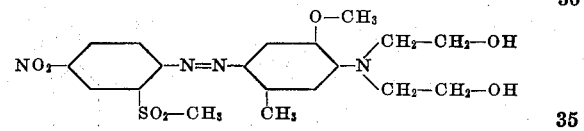

In the following table there are listed some other dyestuffs obtainable in accordance with this invention:—

| | Diazo-component | Coupling component | Color of the solution in ethyl acetate | Dyeing on acetate artificial silk |
|---|---|---|---|---|
| 1 | 2-amino-5-nitrophenyl-methylsulfone | Ethyl-hydroxyethylaniline | Red-violet | Red-violet. |
| 2 | do | Ethyl-ethoxy-ethylaniline | do | Do. |
| 3 | do | 2-methoxy-5-methyl-1-(butyl-methoxyethyl)-aminobenzene | Blue-violet | Blue-violet. |
| 4 | do | Methyl-methoxyethylaniline | Red | Red. |
| 5 | do | 2,5-dimethoxy-1-(di-methoxyethyl)-aminobenzene | Blue-violet | Blue-violet. |
| 6 | do | Methyl-acetoxyethyl-aniline | Ruby | Ruby. |
| 7 | do | Di-hydroxyethylaniline | do | Do. |
| 8 | 2-amino-5-nitrophenyl-ethylsulfone | do | Bordeaux | Bordeaux. |
| 9 | 2-amino-5-nitro-phenyl-benzylsulfone | do | Red | Do. |
| 10 | 2-amino-5-nitro-6-chlorophenylmethylsulfone | do | Red-violet | Red-violet. |
| 11 | do | 2-methoxy-5-methyl-1-(methoxyethyl-di-hydroxypropyl)-aminobenzene | Violet | Violet. |
| 12 | 2-amino-5-nitro-phenyl-methylsulfone | 2-methoxy-5-methyl-1-(hydroxyethyl-methoxyethyl)-aminobenzene | Blue-violet | Blue-violet. |
| 13 | do | 2-methoxy-5-methyl-1-(methoxyethyl-di-hydroxypropyl)-aminobenzene | do | Do. |
| 14 | do | 2-methoxy-5-methyl-1-ethylaminobenzene | Red-violet | Red-violet. |
| 15 | do | Allyl-methoxyethylaniline | Ruby | Ruby. |
| 16 | do | Allyl-ethylaniline | do | Do. |
| | | | Color of the solution in water | Dyeing on wool |
| 17 | 2-amino-5-acetylamino-phenyl-methylsulfone | Ethylbenzylaniline-sulfonic acid | Orange | Orange. |
| 18 | 2-amino-5-acetylamino-phenyl-benzylsulfone | do | do | Do. |

The formulae of the characteristic products of the table are the following:— green solutions and dyeing lacquers and the fiber red to blue tints.

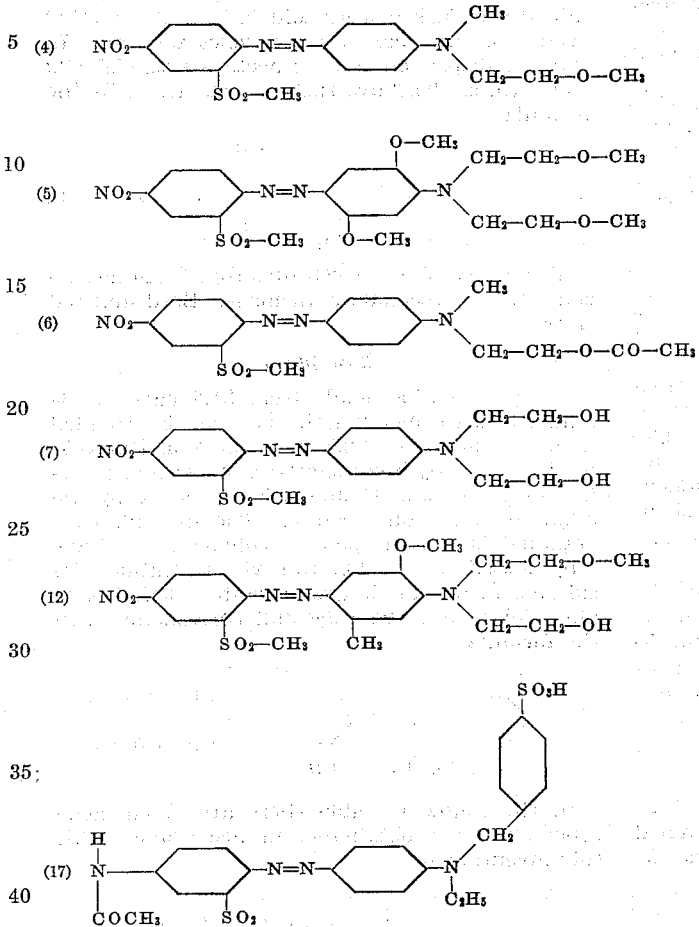

Example 6

10 parts of the dyestuff of Example 2 are stirred with a suitable dispersing agent such as Turkey red oil, sulfite cellulose solution or the sulfonation product of the residue of the benzaldehyde manufacture to form a uniform paste containing 20 per cent. of dyestuff. 1 part of this paste is very intimately mixed with 10 parts of water at 50° C. and so much concentrated soap solution as will make the dye-bath a soap solution of 2 per cent. strength. This mixture is diluted with cold water to about 300 parts. Into the emulsion thus made there are entered 10 parts of acetate artificial silk yarn which is handled while the bath is heated within ¾ hour to 75° C.; dyeing is continued for ¼ hour at this temperature. The goods are then rinsed and brightened as usual. There is obtained a vivid Bordeaux red dyeing.

What we claim is:—

1. The azo-dyestuffs of the general formula

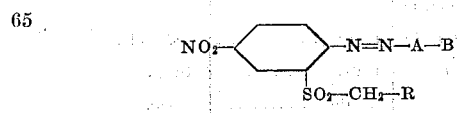

in which R stands for a member of the group consisting of hydrogen, alkyl and aryl, A for an aromatic nucleus of the benzene series, and B for an amino group standing in the 4-position to the —N=N-group, which products are dark powders soluble in pyridine to red, violet, blue and green solutions and dyeing lacquers and the fiber red to blue tints.

2. The azo-dyestuffs of the general formula

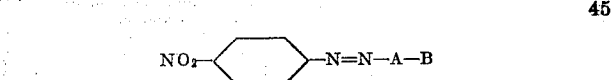

in which R stands for a member of the group consisting of hydrogen, alkyl and aryl, A for an aromatic nucleus of the benzene series containing not more than one phenolic OH-group, and B for an amino-group standing in the 4-position to the —N=N-group, wherein further the aromatic nucleus A does not carry any amino-group other than the amino-group B, which products are dark powders soluble in pyridine to red, violet, blue and green solutions and dyeing lacquers and the fiber red to blue tints.

3. The azo-dyestuffs of the general formula

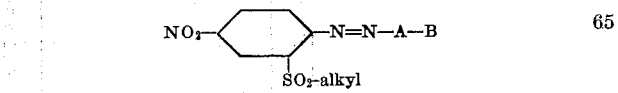

in which A stands for an aromatic nucleus of the benzene series, and B for an amino-group standing in the 4-position to the —N=N-group, which products are dark powders soluble in pyridine to red, violet and blue solutions and dyeing lacquers and the fiber red to blue tints.

4. The unsulfonated azo-dyestuffs of the general formula

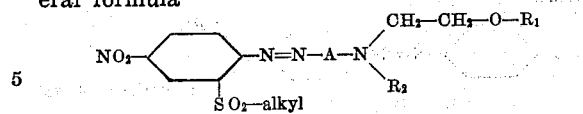

wherein the alkyl-group of the $SO_2$-alkyl radical does not contain more than 2 carbon atoms, A stands for an aromatic nucleus of the benzene series, and the group

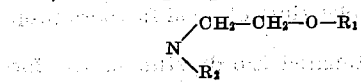

stands in the 4-position to the azo-group, $R_1$ meaning a member of the group consisting of hydrogen, alkyl and acidyl, $R_2$ a member of the group consisting of hydrogen, alkyl and the group $CH_2$—$CH_2$—O—$R_3$, $R_3$ of the latter group standing for a member of the group consisting of hydrogen, alkyl and acidyl, which products are dark powders insoluble in water but dissolving in acetic ester to red to blue solutions, and dyeing acetate artificial silk from a dye-bath containing these products in a fine dispersion red to blue tints of good fastness properties.

5. The unsulfonated azo-dyestuffs of the general formula

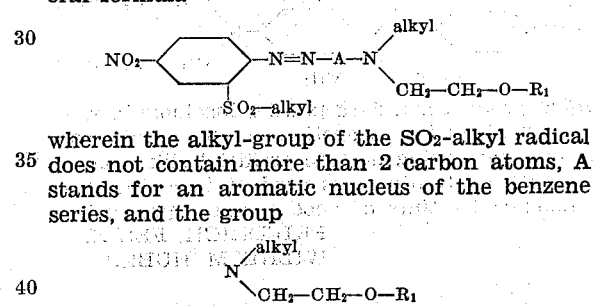

wherein the alkyl-group of the $SO_2$-alkyl radical does not contain more than 2 carbon atoms, A stands for an aromatic nucleus of the benzene series, and the group

stands in the 4-position to the azo-group, $R_1$ meaning a member of the group consisting of hydrogen, alkyl and acidyl, which products are dark powders insoluble in water but dissolving in acetic ester to red to blue solutions, and dyeing acetate artificial silk from a dye-bath containing these products in a fine dispersion red to blue tints of good fastness properties.

6. The unsulfonated azo-dyestuffs of the general formula

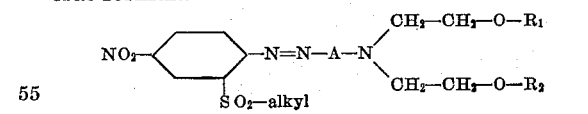

wherein the alkyl-group of the $SO_2$-alkyl radical does not contain more than 2 carbon atoms, A stands for an aromatic nucleus of the benzene series, and the group

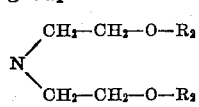

stands in the 4-position to the azo-group, $R_1$ meaning a member of the group consisting of hydrogen, alkyl and acidyl, and $R_2$ a member of the group consisting of hydrogen, alkyl and acidyl, which products are dark powders insoluble in water, but dissolving in acetic ester to red to blue solutions, and dyeing acetate artificial silk from a dye-bath containing these products in a fine dispersion red to blue tints of good fastness properties.

7. The unsulfonated azo-dyestuffs of the general formula

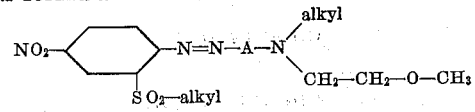

wherein the alkyl-group of the $SO_2$-alkyl radical does not contain more than 2 carbon atoms, A stands for an aromatic nucleus of the benzene series, and the group

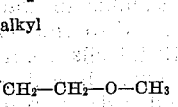

stands in the 4-position to the azo-group, which products are dark powders insoluble in water but dissolving in acetic ester to red to blue solutions, and dyeing acetate artificial silk from a dye-bath containing these products in a fine dispersion red to blue tints of good fastness properties.

8. The unsulfonated azo-dyestuffs of the general formula

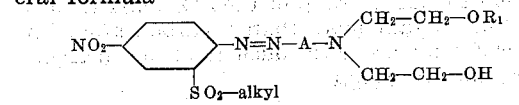

wherein the alkyl-group of the $SO_2$-alkyl radical does not contain more than 2 carbon atoms, A stands for an aromatic nucleus of the benzene series, and the group

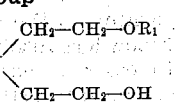

stands in the 4-position to the azo-group, $R_1$ meaning a member of the group consisting of hydrogen, alkyl and acidyl, which products are dark powders insoluble in water but dissolving in acetic ester to red to blue solutions, and dyeing acetate artificial silk from a dye-bath containing these products in a fine dispersion red to blue tints of good fastness properties.

9. The unsulfonated azo-dyestuffs of the general formula

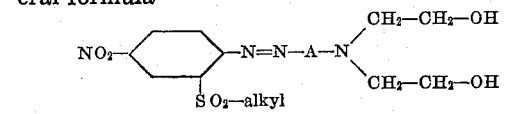

wherein the alkyl-group of the $SO_2$-alkyl radical does not contain more than 2 carbon atoms, A stands for an aromatic nucleus of the benzene series, and the group

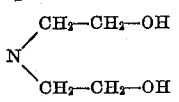

stands in the 4-position to the azo-group, which products are dark powders insoluble in water but dissolving in acetic ester to red to blue solutions, and dyeing acetate artificial silk from a dye-bath containing these products in a fine dispersion red to blue tints of good fastness properties.

10. The unsulfonated azo-dyestuffs of the general formula

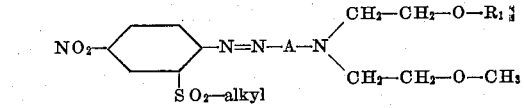

wherein the alkyl-group of the $SO_2$-alkyl radical does not contain more than 2 carbon atoms, A stands for an aromatic nucleus of the benzene series, and the group

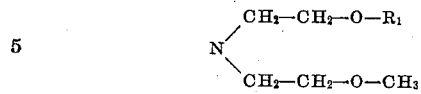

stands in the 4-position to the azo-group, R₁ meaning a member of the group consisting of hydrogen, alkyl and acidyl, which products are dark powders insoluble in water but dissolving in acetic ester to red to blue solutions, and dyeing acetate artificial silk from a dye-bath containing these products in a fine dispersion red to blue tints of good fastness properties.

11. The unsulfonated azo-dyestuffs of the general formula

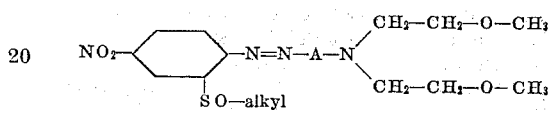

wherein the alkyl-group of the SO₂-alkyl radical does not contain more than 2 carbon atoms, A stands for an aromatic nucleus of the benzene series, and the group

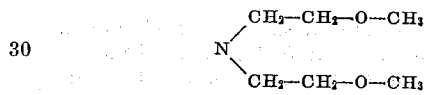

stands in the 4-position to the azo-group, which products are dark powders insoluble in water but dissolving in acetic ester to red to violet-blue solutions, and dyeing acetate artificial silk from a dye-bath containing these products in a fine dispersion red to violet-blue tints of good fastness properties.

12. The unsulfonated azo-dyestuff of the formula

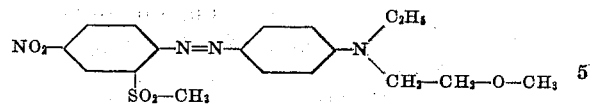

which product is a dark powder insoluble in water, but dissolving in acetic ester to a red violet solution, and dyeing acetate artificial silk from a dye-bath containing this product in a fine dispersion red violet tints of good fastness properties.

13. The unsulfonated azo-dyestuff of the formula

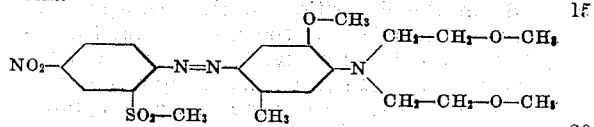

which product is a dark powder insoluble in water, but dissolving in acetic ester to a violet solution, and dyeing acetate artificial silk from a dye-bath containing this product in a fine dispersion violet tints of good fastness properties.

14. The unsulfonated azo-dyestuff of the formula

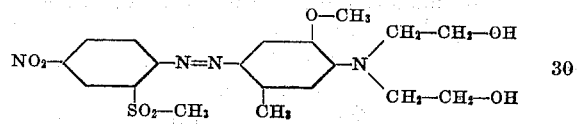

which product is a dark powder insoluble in water, but dissolving in acetic ester to a violet solution, and dyeing acetate artificial silk from a dye-bath containing this product in a fine dispersion violet tints of good fastness properties.

FRIEDRICH FELIX.
WILHELM HUBER.